(12) United States Patent
Takigawa (10) Patent No.: US 8,385,777 B2
(45) Date of Patent: Feb. 26, 2013

(54) DRIVE TRANSMISSION MECHANISM AND IMAGE FORMING APPARATUS INCLUDING SAME

(75) Inventor: Junya Takigawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 333 days.

(21) Appl. No.: 12/926,269

(22) Filed: Nov. 5, 2010

(65) Prior Publication Data

US 2011/0110688 A1    May 12, 2011

(30) Foreign Application Priority Data

Nov. 9, 2009  (JP) ................................. 2009-256094

(51) Int. Cl.
*G03G 15/00* (2006.01)
(52) U.S. Cl. ........................................ 399/167; 399/111
(58) Field of Classification Search .................. 399/111, 399/116, 159, 262, 263
See application file for complete search history.

(56) References Cited

U.S. PATENT DOCUMENTS

| 6,473,580 | B1 * | 10/2002 | Inomata ........................ 399/167 |
| 6,898,386 | B2 | 5/2005 | Takigawa |
| 6,947,693 | B2 | 9/2005 | Kamiya et al. |
| 7,224,921 | B2 | 5/2007 | Iijima et al. |
| 7,340,198 | B2 | 3/2008 | Takigawa |
| 7,356,277 | B2 | 4/2008 | Iijima et al. |
| 7,400,842 | B2 | 7/2008 | Takehara et al. |
| 7,433,631 | B2 * | 10/2008 | Karz et al. ..................... 399/167 |
| 7,532,370 | B2 | 5/2009 | Kudo et al. |
| 7,548,713 | B2 | 6/2009 | Takigawa et al. |
| 7,561,826 | B2 | 7/2009 | Takigawa |
| 7,616,922 | B2 | 11/2009 | Yoshino et al. |
| 2003/0223768 | A1 | 12/2003 | Takigawa |
| 2005/0238380 | A1 | 10/2005 | Iijima et al. |
| 2006/0051131 | A1 | 3/2006 | Takigawa |
| 2006/0110172 | A1 | 5/2006 | Iijima et al. |
| 2006/0120748 | A1 | 6/2006 | Takehara et al. |
| 2007/0071525 | A1 | 3/2007 | Yoshino et al. |
| 2007/0189805 | A1 | 8/2007 | Takigawa |
| 2007/0196129 | A1 | 8/2007 | Takigawa et al. |

(Continued)

FOREIGN PATENT DOCUMENTS

| JP | 2000-227690 | 8/2000 |
| JP | 2000-310908 | 11/2000 |
| JP | 2003-028241 | 1/2003 |
| JP | 2004-108481 | 4/2004 |

(Continued)

OTHER PUBLICATIONS

Abstract of JP 01-199023 published Aug. 10, 1989.

*Primary Examiner* — Hoang Ngo
(74) *Attorney, Agent, or Firm* — Harness, Dickey & Pierce, P.L.C.

(57) ABSTRACT

A drive transmission mechanism including a drive shaft, a rotational driving member having at least two first protrusions and provided to the drive shaft, a driven member having at least two second protrusions and provided to a rotary shaft of a rotary member, deformable connecting parts provided to at least one of portions between the first protrusions and the rotational driving member and portions between the second protrusions and the driven member, and an elastic member covering the deformable connecting parts. The deformable connecting parts displace one of the first and second protrusions relative to one of the rotational driving member and the driven member in a direction tangential to a direction of rotation of the rotational driving member and the driven member upon contact of the first protrusions with the second protrusions.

5 Claims, 8 Drawing Sheets

U.S. PATENT DOCUMENTS

| | | |
|---|---|---|
| 2007/0201901 A1 | 8/2007 | Takigawa et al. |
| 2009/0028597 A1 | 1/2009 | Takigawa et al. |
| 2009/0042656 A1 | 2/2009 | Takigawa et al. |
| 2009/0054164 A1 | 2/2009 | Takigawa et al. |
| 2009/0196655 A1 | 8/2009 | Takigawa et al. |

FOREIGN PATENT DOCUMENTS

| | | |
|---|---|---|
| JP | 2007-304628 | 11/2007 |
| JP | 2008-139427 | 6/2008 |
| JP | 2008-139428 | 6/2008 |

* cited by examiner

DRIVE TRANSMISSION MECHANISM AND IMAGE FORMING APPARATUS INCLUDING SAME

PRIORITY STATEMENT

The present patent application claims priority from Japanese Patent Application No. 2009-256094, filed on Nov. 9, 2009, in the Japan Patent Office, which is hereby incorporated herein by reference in its entirety.

BACKGROUND

1. Technical Field

Illustrative embodiments described in this patent specification generally relate to an image forming apparatus such as a copier, a printer, a facsimile machine, and a multifunction device having two or more of copying, printing, and facsimile functions, and more particularly to a drive transmission mechanism that transmits a driving force from a rotational driving source to members to be rotated such as a photoconductor, a developing sleeve, and a developer agitation screw included in the image forming apparatus.

2. Description of the Related Art

Related-art image forming apparatuses, such as copiers, printers, facsimile machines, and multifunction devices having two or more of copying, printing, and facsimile functions, typically form a toner image on a recording medium (e.g., a sheet of paper, etc.) according to image data using an electrophotographic method. In such a method, for example, a charger charges a surface of an image carrier (e.g., a photoconductor); an irradiating device emits a light beam onto the charged surface of the photoconductor to form an electrostatic latent image on the photoconductor according to the image data; a developing device develops the electrostatic latent image with a developer (e.g., toner) to form a toner image on the photoconductor; a transfer device transfers the toner image formed on the photoconductor onto a sheet; and a fixing device applies heat and pressure to the sheet bearing the toner image to fix the toner image onto the sheet. The sheet bearing the fixed toner image is then discharged from the image forming apparatus.

There is increasing demand for forming higher-quality full-color images using full-color image forming apparatuses, and various image forming methods have been employed in the full-color image forming apparatuses in recent years to meet such a demand. One example of a full-color image forming apparatus includes a single photoconductor, and multiple developing devices corresponding to respective colors of toner are provided around the photoconductor. Toner images of the respective colors are attached to the photoconductor using the multiple developing devices to form a full-color toner image on the photoconductor. The full-color toner image thus formed is then transferred onto a recording medium such as a sheet of paper to form a full-color image on the sheet.

Another example of a full-color image forming apparatus employs a tandem system, in which multiple photoconductors corresponding to respective colors of toner and multiple developing devices respectively corresponding to the multiple photoconductors are provided. Toner images of the respective colors formed on the multiple photoconductors are sequentially transferred onto a sheet and superimposed one atop the other to form a full-color toner image on the sheet.

Compared to the tandem-type full-color image forming apparatus, the full-color image forming apparatus having the single photoconductor has certain advantages, e.g., the size and production costs can be reduced due to the reduced number of photoconductors used for full-color image formation. However, because multiple sequences of image formation are performed using only the single photoconductor, it is difficult to achieve full-color image formation at higher-speed. By contrast, although the size and production costs of the tandem-type full-color image forming apparatus are not easily reduced, the tandem-type full-color image forming apparatus has an advantage in that higher-speed full-color image formation can be achieved. Increasing demand for full-color image formation as fast as monochrome image formation has made the tandem-type full-color image forming apparatus common in recent years.

The tandem-type full-color image forming apparatus employs either an intermediate transfer system or a direct transfer system. In the intermediate transfer system, the image forming apparatus mainly includes the multiple photoconductors corresponding to the number of colors of toner necessary for full-color image formation and an intermediate transfer body such as an intermediate transfer belt. Toner images respectively formed on the multiple photoconductors are primarily transferred onto the intermediate transfer belt by a primary transfer unit, so that toner images are sequentially superimposed one atop the other to form a full-color toner image on the intermediate transfer belt. The full-color toner image thus formed is then secondarily transferred onto a sheet from the intermediate transfer belt by a secondary transfer unit so that a full-color image is formed on the sheet. By contrast, in the direct transfer system, the image forming apparatus mainly includes the multiple photoconductors and a conveyance belt. Toner images respectively formed on the multiple photoconductors are directly transferred onto a sheet conveyed by the conveyance belt through a conveyance path so that the toner images are sequentially superimposed one atop the other to form a full-color image on the sheet.

Compared to the intermediate transfer system, the number of components and production costs can be reduced due to the absence of the intermediate transfer body in the direct transfer system. However, because the toner images formed on the photoconductors are directly transferred onto the sheet in the direct transfer system, the position of each of the toner images can shift upon transfer from the photoconductors onto the sheet when the position of the sheet is inadvertently changed for some reasons, a phenomenon known as color shift. By contrast, although the number of components and production costs are increased, the position at which to secondarily transfer the full-color toner image from the intermediate transfer belt onto the sheet can be set with less limitation in the intermediate transfer system. Accordingly, the degree of freedom to design the image forming apparatus is increased in the intermediate transfer system. Further, even when the position of the sheet is inadvertently changed for some reasons, the full-color toner image is already formed on the intermediate transfer belt so that color shift can be prevented.

In any type of full-color image forming apparatuses, a variety of different members to be rotated by a rotational driving force (hereinafter referred to as rotary members), such as the photoconductors, developing sleeves, and developer agitation screws are provided therein. In general, the rotary members are detachably attachable to the image forming apparatuses for maintenance or replacement, and a drive transmission mechanism is used to transmit the rotational driving force to the rotary member to rotate the rotary member. The drive transmission mechanism mainly includes driven members provided to the rotary members and rotational driving members detachably attachable to the driven members that are coupled to the driven members.

In such an image forming apparatus, image deterioration caused by image shift generally called banding (jitter) is a problem, and it is known that vibration generated between the rotational driving member and the driven member coupled to each other causes such banding. Therefore, generation of vibration needs to be prevented in order to satisfy the increasing demand for higher-quality images.

One of main causes of vibration is a shift between the center of rotation of the rotational driving member and the center of rotation of the driven member upon coupling of the rotational driving member and the driven member. For example, referring the developing sleeve as representative of the rotary member, the developing sleeve inevitably has production tolerances and installation tolerances. Consequently, it is very difficult to accurately position the driven member provided to the rotary shaft of the developing sleeve relative to the rotational driving member provided to the drive shaft. Further, each of the driven member and the rotational driving member has a protrusion so that a lateral surface of the protrusion of the driven member contacts with a lateral surface of the protrusion of the rotational driving member to couple the driven member and the rotational driving member to each other. However, because the protrusions also inevitably have production tolerances and installation tolerances, the center of rotation of the rotational driving member is shifted from the center of rotation of the driven member upon coupling of the rotational driving member and the driven member.

When the center of rotation of the rotational driving member is shifted from the center of rotation of the driven member upon coupling of the rotational driving member and the driven member, the protrusions respectively provided to the rotational driving member and the driven member repeatedly contact to and separate from each other while the rotational driving member and the driven member revolve once. Contact and separation between the protrusions cause impact, and the impact is transmitted to the components and a main body of the image forming apparatus, resulting in vibration causing banding and so forth. Consequently, the quality of full-color images formed by the image forming apparatus is degraded.

Various techniques have been proposed to reduce vibration causing banding in order to prevent deterioration in image quality. For example, an elastic body is twisted around one of protrusions respectively provided to the rotational driving member and the driven member to reduce vibration occurred upon coupling of the rotational driving member and the driven member. However, because the protrusion provided to one of the rotational driving member and the driven member is itself an elastic body, the elastic body may be deformed by collision, and the driven member and the rotational driving member are coupled to each other with the deformed elastic body. As a result, not only occurrence of vibration cannot be prevented, but also additional vibration may occur.

In another approach, a spring-like pick is provided for coupling the driven member and the rotational driving member in order to reduce occurrence of vibration. However, a hinged portion of the pick always receives the rotational driving force, thereby possibly causing a decrease in durability due to a load repeatedly applied to the pick when the rotational driving force is applied to the coupling, application of the rotational driving force to the coupling is stopped, and the coupling is released.

In yet another approach, coupling members are provided in the middle of a drive transmission path through which the rotational driving force is transmitted, and an elastic body is directly provided to a connection section where the coupling members are coupled to each other so that occurrence of vibration is reduced. However, attachment and detachment of the coupling members are very difficult in the above-described configuration. Consequently, employment of the above-described configuration is not appropriate for rotary members such as the photoconductor and the developing sleeve, which are designed to be detachably attachable to the image forming apparatus.

SUMMARY

In view of the foregoing, illustrative embodiments described herein provide a novel drive transmission mechanism. A protrusion of a driven member provided to a rotary shaft of a rotary member contacts with a protrusion of a rotational driving member provided to a drive shaft to couple the driven member to the rotational driving member so that a rotational driving force is transmitted to the rotary member. In the drive transmission mechanism, the driven member and the rotational driving member are easily coupled to and released from each other, and durability of the coupling is enhanced. Further, vibration occurring at the coupling can be reduced. Illustrative embodiments described herein further provide an image forming apparatus including the drive transmission mechanism.

At least one embodiment provides a drive transmission mechanism including a drive shaft, a rotational driving member having at least two first protrusions and provided to the drive shaft, a driven member having at least two second protrusions and provided to a rotary shaft of a rotary member, deformable connecting parts provided to at least one of portions between the first protrusions and the rotational driving member and portions between the second protrusions and the driven member, and an elastic member covering the deformable connecting parts. Lateral surfaces of the second protrusions contact with lateral surfaces of the first protrusions to couple the rotational driving member to the driven member and connect the drive shaft and the rotary shaft to transmit a rotational driving force to the rotary member. The deformable connecting parts displace one of the first and second protrusions integrally formed with the deformable connecting parts relative to one of the rotational driving member and the driven member integrally formed with the deformable connecting parts in a direction tangential to a direction of rotation of the rotational driving member and the driven member upon contact of the first protrusions with the second protrusions. The deformable connecting parts are formed as a single integrated unit together with one of the first protrusions and the rotational driving member, and the second protrusions and the driven member.

At least one embodiment provides an image forming apparatus including the drive transmission mechanism described above.

Additional features and advantages of the illustrative embodiments will be more fully apparent from the following detailed description, the accompanying drawings, and the associated claims.

BRIEF DESCRIPTION OF THE DRAWINGS

A more complete appreciation of the illustrative embodiments described herein and the many attendant advantages thereof will be readily obtained as the same becomes better understood by reference to the following detailed description when considered in connection with the accompanying drawings, wherein.

The accompanying drawings are intended to depict illustrative embodiments and should not be interpreted to limit the scope thereof. The accompanying drawings are not to be considered as drawn to scale unless explicitly noted.

DETAILED DESCRIPTION OF ILLUSTRATIVE EMBODIMENTS

In describing illustrative embodiments illustrated in the drawings, specific terminology is employed for the sake of clarity. However, the disclosure of this specification is not intended to be limited to the specific terminology so selected, and it is to be understood that each specific element includes all technical equivalents that operate in a similar manner and achieve a similar result.

A description is now given of illustrative embodiments of the present invention with reference to drawings, wherein like reference numerals designate identical or corresponding parts throughout the several views.

First, configurations and operation of an intermediate transfer system and a direct transfer system each employed in an image forming apparatus 100 according to illustrative embodiments are described with reference to FIGS. 1 to 4. Because the image forming apparatus 100 illustrated in FIGS. 1 to 4 is well known by a person skilled in the art, the configuration and operation thereof are described only briefly herein.

Figure 1:
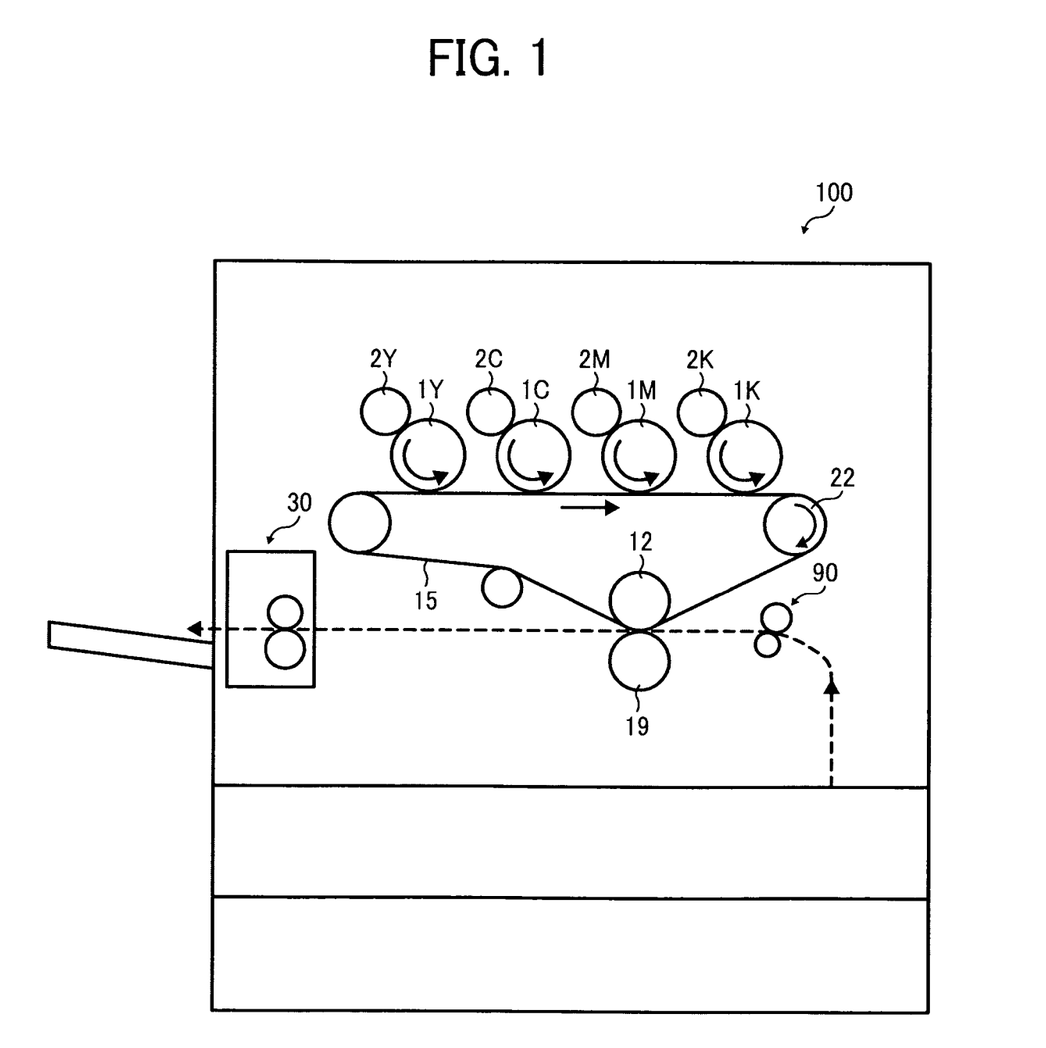
FIG. 1 is a schematic view illustrating an example of a configuration of an image forming apparatus employing an intermediate transfer system according to illustrative embodiments.
Figure 2:
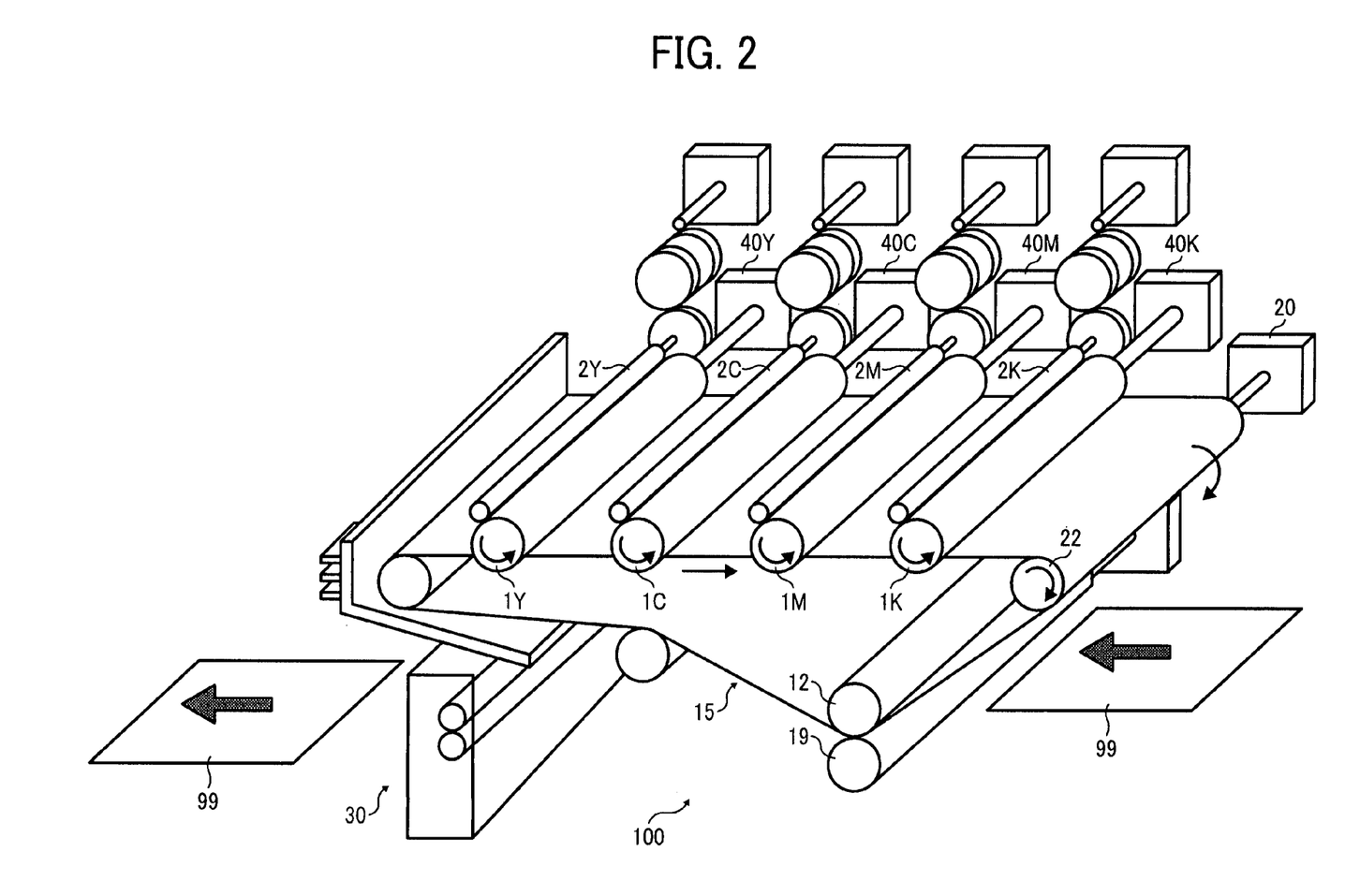
FIG. 2 is a perspective view illustrating an example of a configuration of an image forming section of the image forming apparatus illustrated in FIG. 1.

FIG. 1 is a schematic view illustrating an example of a configuration of a tandem-type image forming apparatus 100 employing an intermediate transfer system according to illustrative embodiments. FIG. 2 is a perspective view illustrating an example of a configuration of an image forming section of the image forming apparatus 100 illustrated in FIG. 1.

The image forming apparatus 100 employing the intermediate transfer system includes photoconductors 1Y, 1C, 1M, and 1K (hereinafter collectively referred to as photoconductors 1), each serving as an image carrier that forms a toner image of a specific color, that is, yellow (Y), cyan (C), magenta (M), or black (K). The photoconductors 1 are provided in an upper portion of the image forming apparatus 100 and disposed at equal intervals along an upper travelling surface of a seamless intermediate transfer belt 15 serving as an intermediate transfer body. The intermediate transfer belt 15 is thus disposed below the photoconductors 1, and is wound around multiple rollers. The photoconductors 1 contact the upper travelling surface of the intermediate transfer belt 15 and are rotated in a counterclockwise direction in FIGS. 1 and 2 by driving sources 40Y, 40C, 40M, and 40K (hereinafter collectively referred to as driving sources 40) such as a driving motor during image formation. A driving roller 22, which is one of the multiple rollers around which the intermediate transfer belt 15 is wound, is driven by a driving source 20 and thus rotates the intermediate transfer belt 15 in a clockwise direction in FIGS. 1 and 2.

Chargers, developing devices respectively including developing sleeves 2Y, 2C, 2M, and 2K (hereinafter collectively referred to as developing sleeves 2), developing blades, developer agitation screws, and so forth, and cleaning devices respectively including cleaning brushes, cleaning blades, collection screws, and so forth are provided around the photoconductors 1, in that order, from upstream to downstream in a direction of rotation of the photoconductors 1. It is to be noted that in FIGS. 1 and 2, for ease of illustration, only the photoconductors 1 and the developing sleeves 2 are shown. The image forming apparatus 100 further includes primary transfer rollers, not shown, each serving as a primary transfer unit provided opposite the photoconductors 1 with the intermediate transfer belt 15 disposed therebetween.

An irradiating device, not shown, serving as an optical writing unit that scans a surface of each of the photoconductors 1 charged by the chargers with a laser beam corresponding to image data of the specific color is provided above the photoconductors 1 to form an electrostatic latent image on the surface of each of the photoconductors 1. The irradiating device may employ a laser scanning system including a laser light source, a polygon mirror, and so forth. Laser beams modulated according to image data to be formed are emitted from respective multiple semiconductor laser light sources. The laser beams thus emitted pass through optical members such as aperture lenses, the polygon mirror, scanning lenses, and scanning mirrors to form the electrostatic latent images corresponding to the image data on the surfaces of the photoconductors 1, respectively.

The developing devices each corresponding to the specific color of toner include the developer agitation screws that agitate developer composed of toner and carrier, respectively. Toner supplied to the developing devices by toner suppliers, not shown, connected to toner cartridges provided to the image forming apparatus 100, or toner already stored in the developing devices, and carrier are agitated and conveyed by the developer agitation screws. The developing blades control thickness of toner layers supplied to the developing sleeves 2, respectively. The electrostatic latent images respectively formed on the surfaces of the photoconductors 1 by the laser beams are developed with the toner layers respectively formed on the developing sleeves 2 when passing through the developing devices so that toner images of the respective colors are formed on the surfaces of the photoconductors 1.

The image forming apparatus 100 further includes a sheet feed cassette, not shown, that stores a recording medium such as a sheet 99 at a lower portion thereof. The sheet 99 fed from the sheet feed cassette by rotation of a sheet feed roller and so forth, not shown, is conveyed to a pair of registration rollers 90. A conveyance path of the sheet 99 is indicated by a broken line in FIG. 1. A secondary transfer roller 19 serving as a secondary transfer unit is provided opposite an opposing roller 12 downstream from the pair of registration rollers 90 in a direction of conveyance of the sheet 99 along the conveyance path. The opposing roller 12 is one of the multiple rollers around which the intermediate transfer belt 15 is wound. A full-color toner image, to be described in detail later, formed on the intermediate transfer belt 15 is secondarily transferred onto the sheet 99 by the transfer roller 19 and the opposing roller 12 at a secondary transfer position formed therebetween. A fixing device 30 is provided downstream from the secondary transfer position in the direction of conveyance of the sheet 99.

A description is now given of image formation performed by the image forming apparatus 100 employing the intermediate transfer system. It is to be noted that configurations and processes for forming toner images of the specific color, that is, yellow, cyan, magenta, or black, on the surfaces of the photoconductors 1 and transferring the toner images thus formed onto the intermediate transfer belt 15 are substantially the same, differing only in the color of toner used.

First, the photoconductors 1 are rotatively driven in a counterclockwise direction in FIGS. 1 and 2 by the driving sources 40. At this time, light is directed from neutralizing devices, not shown, onto the surfaces of the photoconductors 1, respectively, to initialize electric potentials on the surfaces of the photoconductors 1. The surfaces of the photoconductors 1 are then evenly charged by the chargers to a predetermined polarity. The laser light is directed onto the charged surfaces of the photoconductors 1 from the irradiating device based on image data to form electrostatic latent images on the surfaces of the photoconductors 1. It is to be noted that the image data written on each of the surfaces of the photoconductors 1 is single-color image data obtained by separating image data of a full-color image to be formed into image data of the specific color, that is, yellow, magenta, cyan, or black. Thereafter, toner of the specific color is supplied from the developing devices to the electrostatic latent images formed on the surfaces of the photoconductors 1 when the electrostatic latent images pass through the developing sleeves 2, to form toner images of the specific color on the surfaces of the photoconductors 1, respectively.

The intermediate transfer belt 15 is rotatively driven in a clockwise direction in FIGS. 1 and 2 by the driving roller 22. A voltage having a polarity opposite the polarity of the toner images formed on the surfaces of the photoconductors 1 is applied to the primary transfer rollers so that transfer electric fields are generated between the photoconductors 1 and the intermediate transfer belt 15, respectively. As a result, the toner images are primarily transferred onto the intermediate transfer belt 15 rotated in synchronization with the photoconductors 1 from the surfaces of the photoconductors 1, respectively, using static electricity. Specifically, the toner images of the specific color are primarily transferred onto the intermediate transfer belt 15 to be sequentially superimposed one atop the other on the intermediate transfer belt 15 in order from upstream to downstream in a direction of rotation of the intermediate transfer belt 15 to form a full-color toner image on the intermediate transfer belt 15. Residual toner attached to the surfaces of the photoconductors 1 after the toner images are primarily transferred onto the intermediate transfer belt 15 is removed from the surfaces of the photoconductors 1 by the cleaning devices to prepare for the next sequence of image formation.

Meanwhile, the sheet 99 is fed from the sheet feed cassette by the sheet feed roller to be conveyed to the pair of registration rollers 90. A leading edge of the sheet 99 contacts the pair of registration rollers 90 in a stopped state to form a loop so that registration of the sheet 99 is performed. Thereafter, the pair of registration rollers 90 is rotated to convey the sheet 99 to the secondary transfer position in synchronization with the full-color toner image formed on the intermediate transfer belt 15. A transfer voltage having a polarity opposite the polarity of the full-color toner image formed on the intermediate transfer belt 15 is applied to the transfer roller 19 to secondarily transfer the full-color toner image onto the sheet 99 from the intermediate transfer belt 15. The sheet 99 having the transferred full-color toner image thereon is then conveyed to the fixing device 30. In the fixing device 30, heat and pressure are applied to the sheet 99 from a fixing roller and a pressing roller provided in the fixing device 30 to fix the full-color toner image onto the sheet 99. The sheet 99 having the fixed full-color toner image thereon is then discharged from a main body of the image forming apparatus 100 to a discharge tray.

Figure 3:
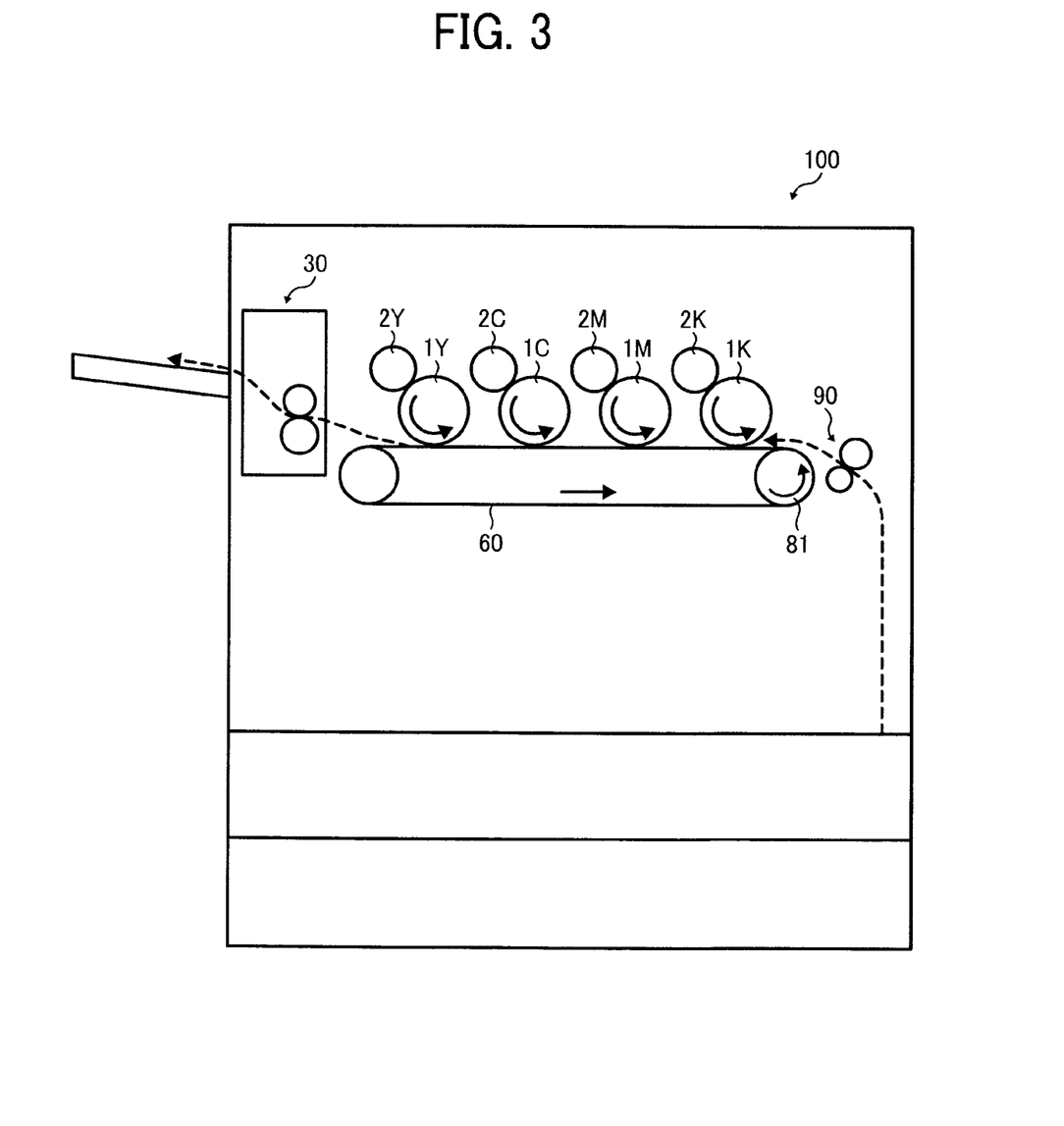
FIG. 3 is a schematic side view illustrating an example of a configuration of an image forming apparatus employing a direct transfer system according to illustrative embodiments.
Figure 4:
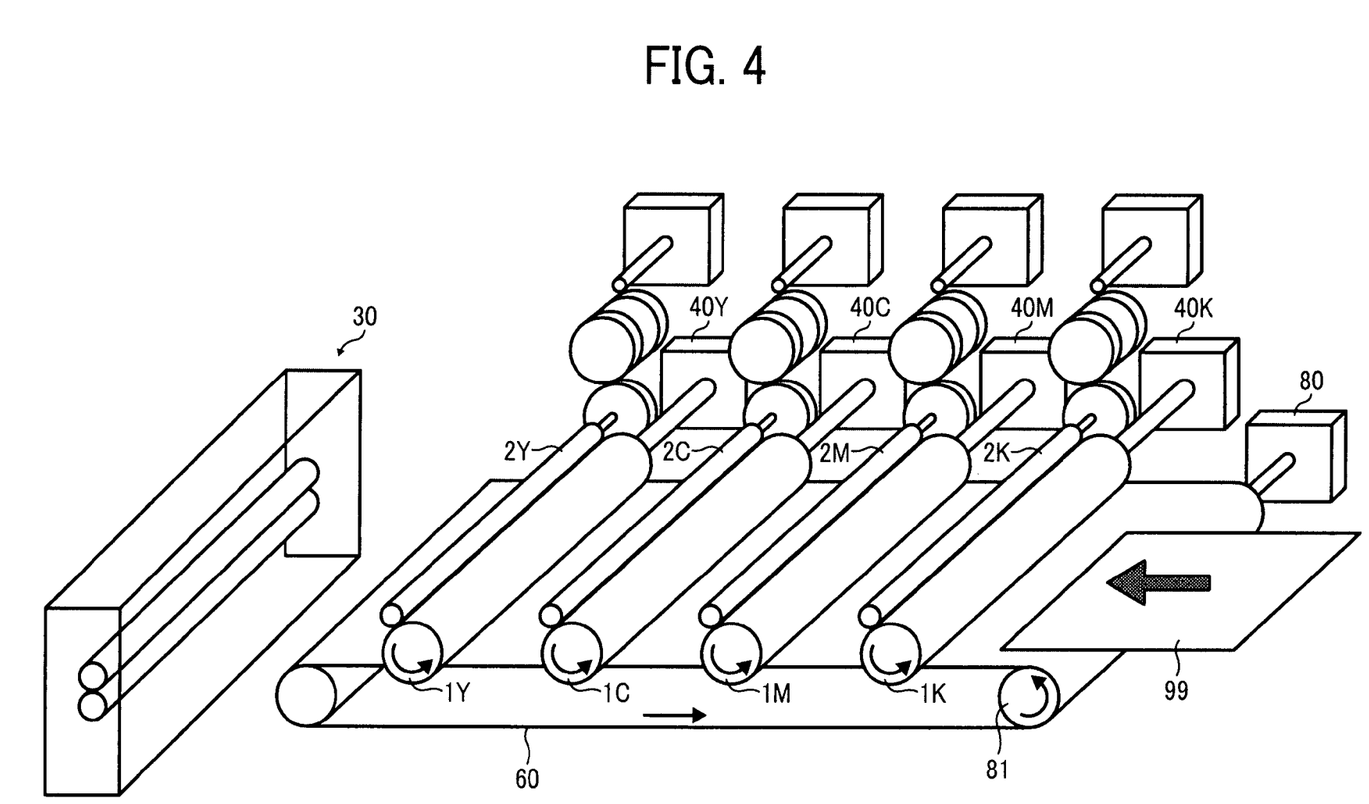
FIG. 4 is a perspective view illustrating an example of a configuration of an image forming section of the image forming apparatus illustrated in FIG. 3.

A description is now given of the image forming apparatus 100 employing a direct transfer system with reference to FIGS. 3 and 4. FIG. 3 is a schematic side view illustrating an example of a configuration of the image forming apparatus 100 employing the direct transfer system. FIG. 4 is a perspective view illustrating an example of a configuration of an image forming section of the image forming apparatus 100 illustrated in FIG. 3. One main difference between the image forming apparatus 100 employing the intermediate transfer system illustrated in FIGS. 1 and 2 and the image forming apparatus 100 employing the direct transfer system illustrated in FIGS. 3 and 4 is that the direct transfer system does not include the intermediate transfer belt 15. Otherwise, the same components shown in FIGS. 3 and 4 are denoted by the same reference numerals used in FIGS. 1 and 2, and the descriptions thereof are omitted.

In a similar manner as the image forming apparatus 100 illustrated in FIGS. 1 and 2, first, electrostatic latent images are respectively formed on the surfaces of the photoconductors 1 by the irradiating device in the image forming apparatus 100 employing the direct transfer system. When passing through the developing devices, the electrostatic latent images are developed with toner of the specific color so that toner images of the specific color are formed on the surfaces of the photoconductors 1, respectively. Meanwhile, the sheet 99 is fed from the sheet feed cassette and is conveyed to the pair of registration rollers 90. The pair of registration rollers 90 conveys the sheet 99 to a conveyance belt 60 in synchronization with the toner images thus formed, so that the toner images are directly transferred from the surfaces of the photoconductors 1 onto the sheet 99 conveyed on the conveyance belt 60 to form a full-color toner image on the sheet 99. Specifically, the conveyance belt 60 is rotated in a counterclockwise direction in FIGS. 3 and 4 by a driving roller 81 rotated by a driving force from a driving source 80. Transfer rollers, not shown, are provided opposite the photoconductors 1 with the conveyance belt 60 disposed therebetween so that the toner images are directly transferred onto the sheet 99 from the surfaces of the photoconductors 1 by the transfer rollers in a manner similar to the primary transfer of the toner images in the image forming apparatus 100 employing the intermediate transfer system illustrated in FIGS. 1 and 2. The sheet 99 having the full-color toner image thereon is then conveyed to the fixing device 30. In the fixing device 30, heat and pressure are applied to the sheet 99 to fix the full-color toner image onto the sheet 99. The sheet 99 having the fixed full-color toner image thereon is discharged from the main body of the image forming apparatus 100 to a discharge' unit such as a discharge tray.

Figure 5:
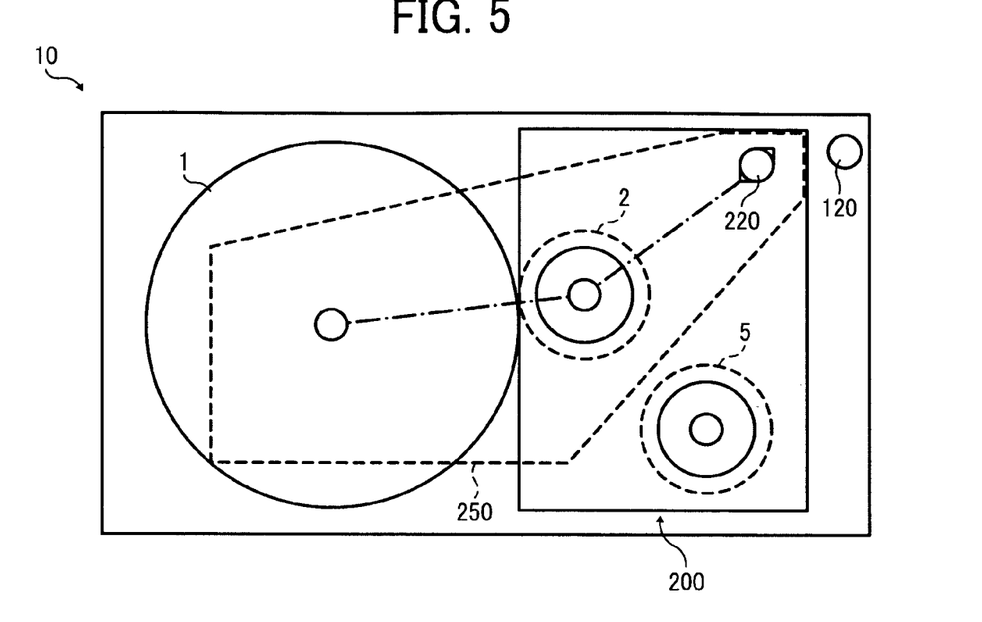
FIG. 5 is a vertical cross-sectional view illustrating an example of a configuration of a process cartridge employed in the image forming apparatus illustrated in FIGS. 1 and 3.
Figure 6:
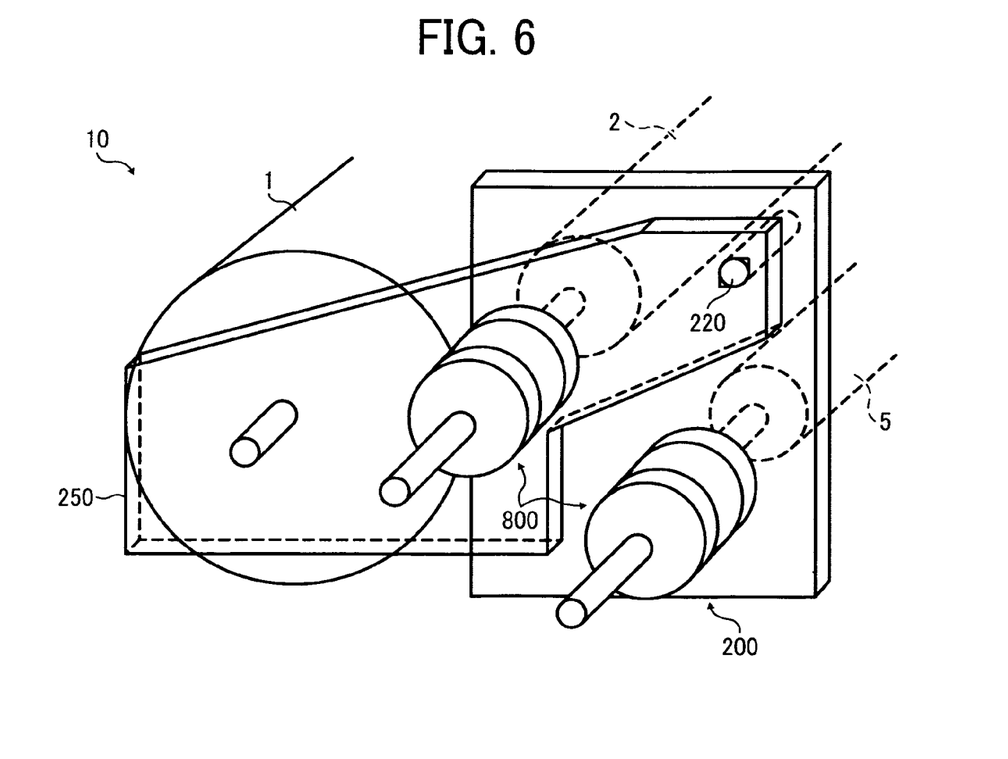
FIG. 6 is a perspective view illustrating the configuration of the process cartridge illustrated in FIG. 5.

Alternatively, the image forming section of the image forming apparatus 100 illustrated in FIGS. 1 to 4 may be composed of process cartridges 10 each corresponding to the specific color of toner illustrated in FIGS. 5 and 6. FIG. 5 is a vertical cross-sectional view illustrating an example of a configuration of the process cartridge 10 employed in the image forming apparatus 100. FIG. 6 is a perspective view illustrating the process cartridge 10 illustrated in FIG. 5.

In each of the process cartridges 10, the photoconductor 1 and a developing unit 200 serving as the developing device, each corresponding to the specific color of toner, are provided as a single integrated unit. In other words, the process cartridge 10 includes the photoconductor 1 and the developing unit 200 including the developing sleeve 2 and the developer agitation screw 5.

A PG face plate 250 provided to the process cartridge 10 controls relative positions of the photoconductor 1 and the developing sleeve 2 so that the photoconductor 1 and the developing sleeve 2 are accurately positioned in the process cartridge 10. Accordingly, variation in a gap formed between the photoconductor 1 and the developing sleeve 2 within the process cartridge 10 can be minimized, and as a result, uneven density of toner supplied to the surface of the photoconductor 1 from the developing sleeve 2 can be prevented.

More specifically, in the developing unit 200, the developing sleeve 2 accurately positioned on the PG face plate 250 is used as a main reference, and a first sub-reference pin 220 provided to the developing unit 200 is used as a sub-reference to accurately position the developing sleeve 2 and the first sub-reference pin 220 in the process cartridge 10 via the PG face plate 250. The process cartridge 10 itself is positioned in the image forming apparatus 100 using a rotary shaft of the photoconductor 1 as a main reference and a second sub-reference pin 120 as a sub-reference.

In order to rotate members to be rotated (hereinafter referred to as rotary members) in the process cartridge 10, that is, the photoconductor 1, the developing sleeve 2, and the developer agitation screw 5, a rotational driving force is required to be transmitted to the rotary members. Therefore, a drive shaft to which the rotational driving force is transmitted from a driving source needs to be connected to a rotary shaft of the rotary member. Accordingly, a rotational driving member provided to the drive shaft is coupled to a driven member provided to the rotary shaft of the rotary member.

As shown in FIG. 6, rotary shafts of the rotary members protrude from an exterior of the process cartridge 10 detachably attachable to the image forming apparatus 100. The driven member provided to a portion of the rotary shaft protruding from the exterior of the process cartridge 10 and the rotational driving member provided to the drive shaft to which the rotational driving force is transmitted from the driving source are coupled to each other to further transmit the rotational driving force to the rotary member. In FIG. 6, reference numeral 800 denotes the above-described coupling of the driven member and the rotational driving member for each of the developing sleeve 2 and the developer agitation screw 5.

Figure 7:
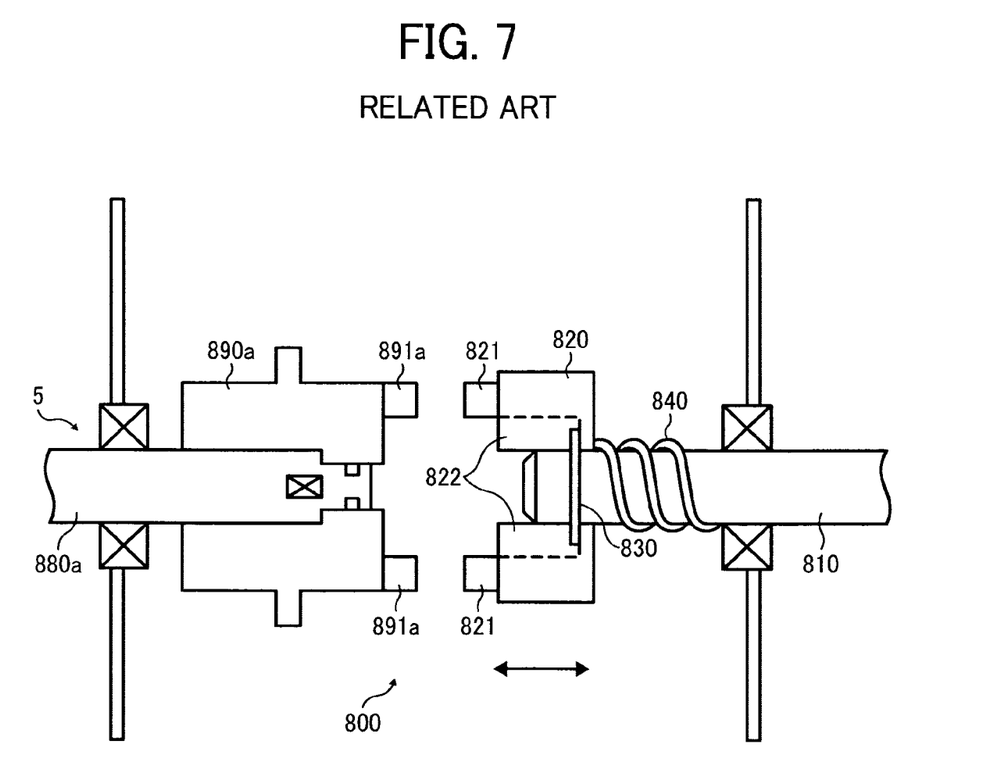
FIG. 7 is a vertical cross-sectional view illustrating coupling of a rotational driving member and a driven member in a related-art drive transmission mechanism.

For reference purposes, FIG. 7 is a vertical cross-sectional view illustrating the coupling 800 used in a related-art drive transmission mechanism. Specifically, FIG. 7 illustrates a state immediately before a rotational driving member 820 and a driven member 890a of the rotary member, that is, the developer agitation screw 5, are coupled to each other. In other words, the coupling 800 is completed by moving the driven member 890a toward the rotational driving member 820. It is to be noted that the coupling 800 illustrated in FIG. 7 is one example of that used in the related-art drive transmission mechanism, applied to the developer agitation screw 5. Further, the coupling 800 is applicable not only to the developer agitation screw 5 but also other members to be rotated detachably attachable to the image forming apparatus 100 such as the photoconductor 1 and the developing sleeve 2.

The drive transmission mechanism using the coupling 800 of the related art includes a drive shaft 810 rotated by a rotational driving force transmitted from a driving source through transmission members such as gears and pulleys, the rotational driving member 820 provided to the drive shaft 810, and the driven member 890a coupled to the rotational driving member 820. The rotational driving member 820 remains unrotatable relative to the drive shaft 810. Specifically, a connection pin 830 is provided to the drive shaft 810, and both ends of the connection pin 830 are inserted into a groove 822 provided within the rotational driving member 820 to fix the rotational driving member 820 to the drive shaft 810. Accordingly, the rotational driving member 820 is not able to rotate relative to the drive shaft 810. The rotational driving member 820 has at least two protrusions 821 (hereinafter referred to as first protrusions 821). The driven member 890a is provided to a rotary shaft 880a of the developer agitation screw 5 to transmit the rotational driving force from the drive shaft 810 to the developer agitation screw 5. The driven member 890a also has at least two protrusions 891a (hereinafter referred to as second protrusions 891a) symmetrically provided thereto relative to the center of the rotary shaft 880a. A lateral surface of each of the first protrusions 821 contacts with a lateral surface of each of the second protrusions 891a so that the rotational driving member 820 and the driven member 890a are coupled to each other. As a result, the drive shaft 810 and the rotary shaft 880a are connected to each other.

A retracting member such as a spring 840 is provided to an end of the rotational driving member 820 such that the rotational driving member 820 retracts in a direction of an axis of the drive shaft 810 when the first protrusions 821 of the rotational driving member 820 and the second protrusions 891a of the driven member 890a collide against each other upon attachment or detachment of the process cartridge 10 to or from the image forming apparatus 100. Accordingly, the process cartridge 10 can be smoothly attached to and detached from the image forming apparatus 100 even when the first protrusions 821 and the second protrusions 891a collide against each other.

In the drive transmission mechanism of the related art illustrated in FIG. 7, the rotational driving member 820 is coupled to the driven member 890a via the first protrusions 821 and the second protrusions 891a as described above. Specifically, the lateral surfaces of the first and second protrusions 821 and 891a contact with each other while the drive shaft 810 is rotated by the rotational driving force from the driving source, so that the rotational driving force is further transmitted from the drive shaft 810 to the rotary shaft 880a of the developer agitation screw 5 via the rotational driving member 820 and the driven member 890a.

In the above-described configuration, in theory, when the center of rotation of the drive shaft 810 and the center of rotation of the rotary shaft 880a are precisely aligned, and further, when the positions of the first protrusions 821 precisely correspond to the positions of the second protrusions 891a, respectively, the rotational driving member 820 and the driven member 890a and the first protrusions 821 and the second protrusions 891a are precisely positioned relative to each other. As a result, the lateral surfaces of the first and second protrusions 821 and 891a remain fully in contact with each other at desired positions while the drive shaft 810 is rotated.

Figure 8:
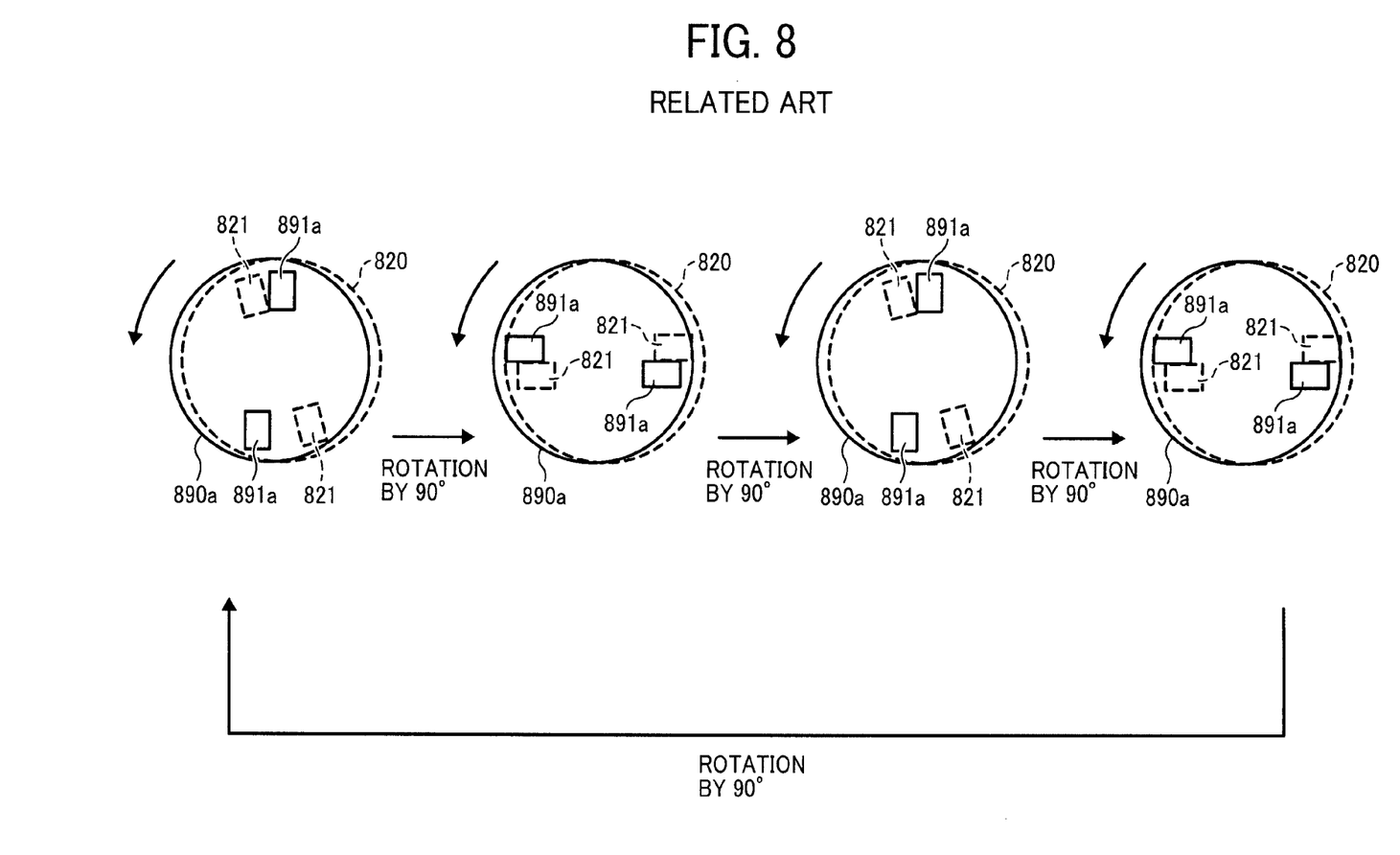
FIG. 8 is a schematic view illustrating contact and separation of protrusions respectively provided to the driven member and the rotational driving member in time series while the driven member and the rotational driving member revolve once in the related-art drive transmission mechanism.

However, in practice, mechanical tolerances are inevitable, and it is not possible to precisely align the center of rotation of the drive shaft 810 relative to the center of rotation of the rotary shaft 880a. Consequently, as shown in FIG. 8 showing rotation through 90 degrees, the first and second protrusions 821 and 891a that transmit the rotational driving force repeatedly contact to and separate from each other while the rotational driving member 820 and the driven member 890a revolve once. Repeated contact and separation of the first and second protrusions 821 and 891a cause impact causing vibration which is transmitted to the image forming section of the image forming apparatus 100 through the process cartridge 10 or the like, thereby adversely affecting image quality and causing banding.

Conceivably, varying the number of protrusions could solve the above-described problem. In the examples shown in FIGS. 7 and 8, only the two second protrusions 891a and the two first protrusions 821 are provided to the driven member 890a and the rotational driving member 820, respectively. Increasing the number of each of the first and second protrusions 821 and 891a shortens intervals between contact and separation of the first and second protrusions 821 and 891a, although the above-described problem still persists. By contrast, when the number of each of the first and second protrusions 821 and 891a is reduced to 1, separation of the first and second protrusions 821 and 891a does not occur, thereby preventing impact causing vibration. However, instead of occurrence of vibration, rotation of the first protrusion 821 that is rotated together with the drive shaft 810 applies a force in an unexpected direction to the second protrusion 891a, thereby swinging the rotary member (or the developer agitation screw 5) while the drive shaft 810 revolves once. Accordingly, the present invention is applicable to the drive transmission mechanism in which the rotational driving force is transmitted using at least two protrusions.

Figure 9A:
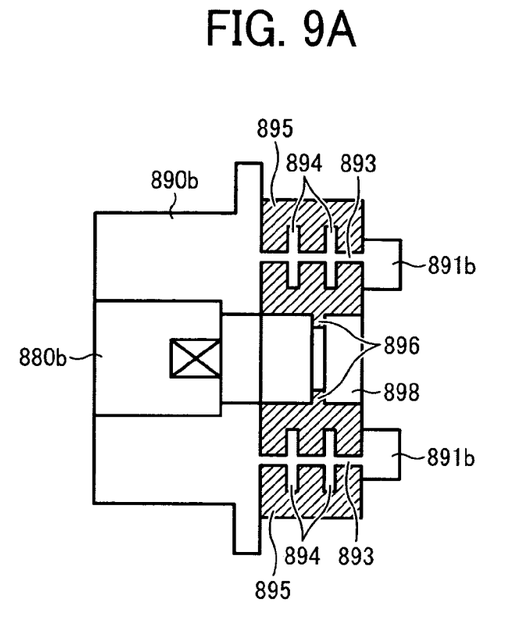
FIG. 9A is a vertical cross-sectional view illustrating an example of a configuration of a driven member provided to a drive transmission mechanism according to illustrative embodiments.
Figure 9B:
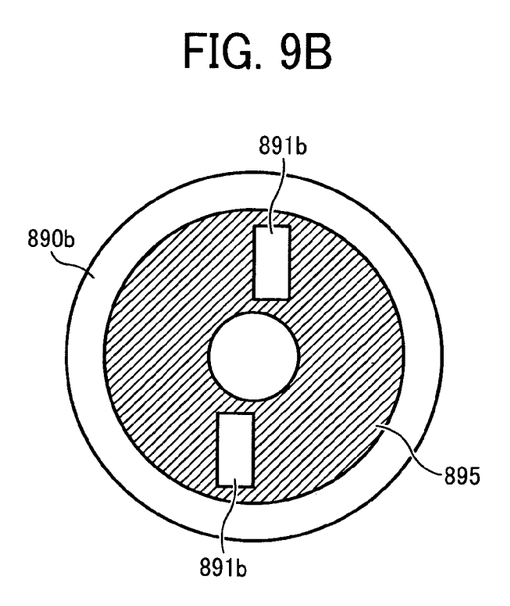
FIG. 9B is a front view illustrating the driven member illustrated in FIG. 9A.

In order to effectively prevent occurrence of vibration, the present embodiment employs a driven member 890b illustrated in FIGS. 9A and 9B, in which the driven member 890b is provided to a rotary shaft 880b such that the driven member 890b remains unrotatable relative to the rotary shaft 880b. The driven member 890b has at least two protrusions 891b (hereinafter referred to as second protrusions 891b) symmetrically provided thereto relative to the center of the rotary shaft 880b. FIG. 9A is a vertical cross-sectional view illustrating an example of a configuration of the driven member 890b according to illustrative embodiments. FIG. 9B is a front view illustrating the driven member 890b illustrated in FIG. 9A. For ease of understanding, FIGS. 9A and 9B do not show the rotational driving member 820.

The driven member 890b has deformable connecting parts 893 provided between the driven member 890b and the second protrusions 891b. The driven member 890b, the second protrusions 891b, and the deformable connecting parts 893 are formed together as a single integrated unit. The shape and material of the connecting parts 893 provide a spring-like elasticity to the connecting parts 893. When the first protrusions 821 receive the rotational driving force transmitted from the driving source through the drive shaft 810 while contacting with the second protrusions 891b, the connecting parts 893 are deformable relative to the driven member 890b in a direction tangential to a direction of rotation of the driven member 890b depending on a contact force between the first and second protrusions 821 and 891b generated corresponding to the rotational driving force.

In the example illustrated in FIG. 9A, each of the connecting parts 893 is thinner than a vertical cross-section of each of the second protrusions 891b to give the connecting parts 893 spring. Not only the shape but also the material can give the connecting parts 893 spring. For example, because the second protrusions 891b and the driven member 890b integrally formed with the connecting parts 893 are also required to have spring while having rigidity, it is preferable that the connecting parts 893 be formed of a resin such as polyacetal (POM) or nylon (PA). Thus, the connecting parts 893 have spring given by the shape and material as described above such that the second protrusions 891b are displaced, or tilted, relative to the driven member 890b in the direction tangential to the direction of rotation of the driven member 890b. An amount of displacement or tilt of each of the second protrusions 891b relative to the driven member 890b in the direction tangential to the direction of rotation of the driven member 890b are determined upon design or based on experimental results using connecting parts having the appropriate shape and material.

The lateral surfaces of the first protrusions 821 provided to the rotational driving member 820 and the lateral surfaces of the second protrusions 891b provided to the driven member 890b contact with each other, respectively, to transmit the rotational driving force from the rotational driving member 820 to the rotary member (or the developer agitation screw 5). At this time, the connecting parts 893 are deformable relative to the driven member 890b in the direction tangential to the direction of rotation of the driven member 890b. Accordingly, even when the center of rotation of the rotational driving member 820 is shifted from the center of rotation of the driven member 890b, deformation of the connecting parts 893 in the direction tangential to the direction of rotation of the driven member 890b compensate the shift, and the first and second protrusions 821 and 891b always contact with each other, respectively, while the rotational driving member 820 and the driven member 890b are rotated. As a result, vibration caused by impact generated by repeated contact and separation of the first and second protrusions 821 and 891b can be effectively reduced.

Further, the connecting parts 893 illustrated in FIG. 9A are covered with an elastic member 895 having appropriate elasticity. When the connecting parts 893 receive the rotational driving force and are deformed in the direction tangential to the direction of rotation of the driven member 890b, or when an amount of deformation of the connecting parts 893 is changed, the elastic member 895 absorbs vibration possibly occurring due to deformation of the connecting parts 893 or a change in the amount of deformation of the connecting parts 893, thereby preventing occurrence of vibration. In addition, because the elastic member 895 covering the connecting parts 893 compensates for deformation of the connecting parts 893 or a change in the amount of deformation of the connecting parts 893 as described above, a decrease in rigidity and tolerance of the connecting parts 893 each having a very thin shape can be prevented, thereby effectively reducing destruction of the connecting parts 893. Therefore, elasticity for appropriately preventing occurrence of vibration and tolerance for reducing destruction of the connecting parts 893 are required of the material of the elastic member 895. Examples of the materials used for the elastic member 895 include, but are not limited to, polyurethane elastomer and polyolefin elastomer.

The connecting parts 893 are provided to positions different from the positions of the first and second protrusions 821 and 891b contacting with each other, and only the connecting parts 893 are covered with the elastic member 895. Accordingly, no component prevents contact of the first protrusions 821 with the second protrusions 891b, and therefore, the first and second protrusions 821 and 891b easily and reliably contact with each other.

The two connecting parts 893 provided to the two second protrusions 891b, respectively, are integrally covered with the single elastic member 895. Alternatively, the elastic member 895 may be provided to each of the two connecting parts 893, respectively, in order to achieve the effectiveness of the elastic member 895 described above. However, the single elastic member 895 covering the two connecting parts 893 of the second protrusions 891b can integrally compensate deformation of both of the connecting parts 893 and the change in the amount of deformation of both of the connecting parts 893, thereby more effectively reducing an amount of deformation of the elastic member 895 and the connecting parts 893, and further reducing destruction of the connecting parts 893.

Further still, each of the connecting parts 893 includes wedge-shaped extended portions 894 each extending in a direction perpendicular to a direction in which the connecting parts 893 extend from the driven member 890b to the second protrusions 891b. Although the extended portions 894 are not necessarily provided to each of the connecting parts 893, provision of the extended portions 894 increases the size of a portion where the elastic member 895 contacts with the connecting parts 893. As a result, a shift in the elastic member 895 contacting the connecting parts 893 can be reduced upon deformation of the connecting parts 893, thereby effectively reducing destruction of the connecting parts 893 caused by sliding of the connecting parts 893 against the elastic member 895. Although each of the connecting parts 893 illustrated in FIG. 9A has the two extended portions 894, the number of the extended portions 894 provided to each of the connecting parts 893 is not limited thereto. Because it is provided to the connecting parts 893 in order to increase the size of the portion where the elastic member 895 contacts with the connecting parts 893 as described above, the extended portion 894 is provided to at least a portion of each of the connecting parts 893, and the number of the extended portions 894 may be one, two, or more.

The elastic member 895 has convexities 896 which are fitted into a groove provided to a protrusion 898 protruding toward the elastic member 895 from the driven member 890b. Accordingly, a part of the elastic member 895 that is easily deformed can be fixed to the driven member 890b, and each of the convexities 896 serves as a stopper to prevent separation of the elastic member 895 from the driven member 890b. As a result, the elastic member 895 can be easily fixed to the driven member 890b or the rotary shaft 880b without additional components.

It is preferable that the driven member 890b including the connecting parts 893 and the elastic member 895 be manufactured using coinjection molding. Coinjection molding is well known by persons skilled in the art, and uses two different materials. First, a primary-side section is formed of the first material, and then a secondary-side section is formed of the second material so that the secondary-side section is formed coaxially to the primary-side section as a single integrated unit. In the example illustrated in FIG. 9A, first, the driven member 890b including the connecting parts 893 and the second protrusions 891b is formed as the primary-side section, and then the elastic member 895 is formed as the secondary-side section coaxially to the driven member 890b using different metallic mold so that the driven member 890b and the elastic member 895 are integrally formed as a single integrated unit. The driven member 890b including the connecting parts 893 and the elastic member 895 can be more easily formed by coinjection molding in a shorter period of time compared to a method in which the elastic member 895 is fitted into the driven member 890b after the driven member 890b including the connecting parts 893 is formed, thereby reducing production costs. Use of coinjection molding is particularly effective when the connecting parts 893 have a complicated shape such as the wedge-shaped extended portions 894.

Although the connecting parts 893 covered with the elastic member 895 are provided to the driven member 890b according to the foregoing illustrative embodiments, the configuration is not limited thereto. For example, the connecting parts 893 may be provided to the rotational driving member 820 in place of the driven member 890b to achieve the same effectiveness described above. In such a case, the driven member 890b and the second protrusions 891b described above are replaced with the rotational driving member 820 and the first protrusions 821, respectively. In other words, the connecting parts 893 may be provided either the driven member 890b or the rotational driving member 820. Specifically, the connecting parts 893 may be provided at least one of portions between the second protrusions 891b and the driven member 890b, respectively, and portions between the first protrusions 821 and the rotational driving member 820, respectively. Further, the connecting parts 893, the second protrusions 891b, and the driven member 890b, or the connecting parts 893, the first protrusions 821, and the rotational driving member 820, are formed together as the single integrated unit to achieve the goal of the present invention. Although they may be provided to either the rotational driving member 820 or the driven member 890b as described above, the connecting parts 893 are always covered with the elastic member 895. Provision of the connecting parts 893 to the driven member 890b as described above in the foregoing illustrative embodiments can extend a product life of the image forming apparatus 100 by using a metal member having high durability as the first protrusion 821 and the rotational driving member 820 provided to the main body of the image forming apparatus 100. Therefore, it is preferable that the connecting parts 893 be provided to the driven member 890b of the rotary member.

Although the above description uses the developer agitation screw 5 provided to the image forming apparatus 100 employing an electrophotographic method as a representative example, the drive transmission mechanism according to the foregoing illustrative embodiments is not limited thereto. For example, the drive transmission mechanism according to the foregoing illustrative embodiments is applicable to the photoconductor 1 or the developing sleeve 2. Alternatively, the drive transmission mechanism according to the foregoing illustrative embodiments is applicable to rotary members included in a belt cleaning device or the cleaning devices that clean surfaces of the photoconductors 1, for which high rotary accuracy is not required, in order to prevent occurrence of vibration. Further, the rotary member may not be provided within the process cartridge 10 as a single integrated unit.

The foregoing illustrative embodiments are applicable to any drive transmission configuration in which a rotational driving force is transmitted to a rotary member by contacting a protrusion provided to a rotational driving member with a protrusion provided to the rotary member to couple the rotational driving member to the rotary member.

Further, the foregoing illustrative embodiments are applicable to a drive transmission configuration that transmits a rotational driving force to a rotary member employed in image forming apparatuses such as copiers, printers, facsimile machines, and multifunction devices having two or more of copying, printing, and facsimile functions.

It is to be noted that illustrative embodiments of the present invention are not limited to those described above, and various modifications and improvements are possible without departing from the scope of the present invention. It is therefore to be understood that, within the scope of the associated claims, illustrative embodiments may be practiced otherwise than as specifically described herein. For example, elements and/or features of different illustrative embodiments may be combined with each other and/or substituted for each other within the scope of the illustrative embodiments.

What is claimed is:

1. A drive transmission mechanism comprising:
   a drive shaft;
   a rotational driving member having at least two first protrusions and provided to the drive shaft;
   a driven member having at least two second protrusions and provided to a rotary shaft of a rotary member, lateral surfaces of the second protrusions contacting lateral surfaces of the first protrusions to couple the rotational driving member to the driven member and connect the drive shaft and the rotary shaft to transmit a rotational driving force to the rotary member;
   deformable connecting parts provided to at least one of portions between the first protrusions and the rotational driving member and portions between the second protrusions and the driven member, to displace one of the first and second protrusions integrally formed with the deformable connecting parts relative to one of the rotational driving member and the driven member integrally formed with the deformable connecting parts in a direction tangential to a direction of rotation of the rotational driving member and the driven member upon contact of the first protrusions with the second protrusions; and
   an elastic member covering the deformable connecting parts,
   the deformable connecting parts formed as a single integrated unit together with one of the first protrusions and the rotational driving member, and the second protrusions and the driven member.

2. The drive transmission mechanism according to claim 1, wherein each of the deformable connecting parts comprises an extended portion extending in a direction perpendicular to a direction in which the deformable connecting parts extend.

3. The drive transmission mechanism according to claim 1, wherein the elastic member comprises a convexity that engages a groove formed in one of the rotational driving member and the driven member.

4. The drive transmission mechanism according to claim 1, wherein the elastic member and one of the first protrusions, the rotational driving member, and the deformable connecting parts formed together as a single integrated unit, and the second protrusions, the driven member, and the deformable connecting parts formed together as a single integrated unit, are coinjection molded.

5. An image forming apparatus comprising a drive transmission mechanism, the drive transmission mechanism comprising:
   a drive shaft;
   a rotational driving member having at least two first protrusions and provided to the drive shaft;
   a driven member having at least two second protrusions and provided to a rotary shaft of a rotary member, lateral surfaces of the second protrusions contacting lateral surfaces of the first protrusions to couple the rotational driving member to the driven member and connect the drive shaft and the rotary shaft to transmit a rotational driving force to the rotary member;
   deformable connecting parts provided to at least one of portions between the first protrusions and the rotational driving member and portions between the second protrusions and the driven member, to displace one of the first and second protrusions integrally formed with the deformable connecting parts relative to one of the rotational driving member and the driven member integrally formed with the deformable connecting parts in a direction tangential to a direction of rotation of the rotational driving member and the driven member upon contact of the first protrusions with the second protrusions; and
   an elastic member covering the deformable connecting parts,
   the deformable connecting parts formed as a single integrated unit together with one of the first protrusions and the rotational driving member, and the second protrusions and the driven member.

* * * * *